US011882390B2

(12) United States Patent
Chen et al.

(10) Patent No.: US 11,882,390 B2
(45) Date of Patent: Jan. 23, 2024

(54) METHOD AND SYSTEM FOR ALLOCATING DEDICATED PROTECTED SPECTRUM BASED ON CROSSTALK AWARENESS

(71) Applicant: SOOCHOW UNIVERSITY, Suzhou (CN)

(72) Inventors: Bowen Chen, Suzhou (CN); Jingwen Hu, Suzhou (CN); Qi Chen, Suzhou (CN); Gangxiang Shen, Suzhou (CN); Mingyi Gao, Suzhou (CN); Weidong Shao, Suzhou (CN); Hong Chen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 67 days.

(21) Appl. No.: 17/787,571

(22) PCT Filed: Aug. 23, 2021

(86) PCT No.: PCT/CN2021/113938
§ 371 (c)(1),
(2) Date: Jun. 20, 2022

(87) PCT Pub. No.: WO2023/004903
PCT Pub. Date: Feb. 2, 2023

(65) Prior Publication Data
US 2023/0319444 A1    Oct. 5, 2023

(30) Foreign Application Priority Data

Jul. 29, 2021    (CN) .......................... 202110864420.4

(51) Int. Cl.
*H04B 10/00*    (2013.01)
*H04Q 11/00*    (2006.01)
(Continued)

(52) U.S. Cl.
CPC ....... *H04Q 11/0062* (2013.01); *H04B 10/032* (2013.01); *H04Q 11/0005* (2013.01);
(Continued)

(58) Field of Classification Search
CPC ............... H04J 14/0226; H04J 14/0254; H04J 14/0256; H04J 14/0257; H04J 14/026;
(Continued)

(56) References Cited

U.S. PATENT DOCUMENTS

2020/0389248 A1* 12/2020 Goto ....................... H04J 14/02
2021/0050918 A1*  2/2021 Rekaya ............. H04B 10/2581

FOREIGN PATENT DOCUMENTS

| CN | 108696777 A | 10/2018 |
| CN | 108834004 A | 11/2018 |
| CN | 110769335 A |  2/2020 |

* cited by examiner

*Primary Examiner* — Daniel G Dobson
(74) *Attorney, Agent, or Firm* — SZDC Law PC

(57) ABSTRACT

The present invention relates to a method and system for allocating a dedicated protected spectrum based on crosstalk awareness, including calculation, core selection, a modulation format, and spectrum allocation. First, working paths are first established: selecting a modulation format; determining a maximum allowable crosstalk value, classifying cores, calculating inter-core crosstalk values of all available spectrum blocks, and selecting a spectrum block with the smallest crosstalk value for allocation; and then dedicated protection paths are established: selecting a modulation format; determining a maximum allowable crosstalk value, classifying cores, calculating inter-core crosstalk values of all available spectrum blocks, and selecting a spectrum block with the smallest crosstalk value for allocation. The present invention improves the spectrum resource efficiency of a space-division multiplexing elastic optical network, reduces a crosstalk value of each fiber link, and implements (Continued)

the survivability of a space-division multiplexing optical network.

10 Claims, 5 Drawing Sheets

(51) Int. Cl.
*H04B 10/032* (2013.01)
*H04J 14/00* (2006.01)
(52) U.S. Cl.
CPC ............... *H04Q 2011/0049* (2013.01); *H04Q 2011/0086* (2013.01)
(58) Field of Classification Search
CPC ...... H04J 14/0267; H04J 14/05; H04J 14/052; H04B 10/2581
See application file for complete search history.

METHOD AND SYSTEM FOR ALLOCATING DEDICATED PROTECTED SPECTRUM BASED ON CROSSTALK AWARENESS

This application is the National Stage Application of PCT/CN2021/113938, filed on Aug. 23, 2021, which claims priority to Chinese Patent Application No. 202110864420.4, filed on Jul. 29, 2021, which is incorporated by reference for all purposes as if fully set forth herein.

FIELD OF THE INVENTION

The present invention relates to the fields of data communication and optical communication technologies, and in particular, to a method and system for allocating a dedicated protected spectrum based on crosstalk awareness.

DESCRIPTION OF THE RELATED ART

In recent years, the demand for communication network bandwidth has grown rapidly. The bandwidth demand provided by a conventional wavelength division multiplexing optical network can neither meet the requirements nor ensure efficient resource efficiency of the network. To meet elastic allocation of bandwidth granularity for services, an elastic optical network can flexibly slice and allocate spectrum resources of the network according to service demands, thereby avoiding a spectrum waste and improving the utilization of spectrum resources.

In an elastic optical network, the physical capacity limit of a conventional single-mode optical fiber is quickly exhausted. To solve the foregoing problem, the space-division multiplexing technology represented by a multicore optical fiber turns an original single-core optical fiber into a multicore optical fiber, thereby greatly improving the transmission capacity of the optical fiber. However, the presence of multiple cores causes crosstalk between different cores when optical signals are transmitted between the different cores, affecting the quality of end-to-end optical signal transmission. In particular, in a multi-core elastic optical network, during the allocation of spectrum resources of the network, if spectrum slots with the same number in adjacent cores are occupied at the same time, significant inter-fiber crosstalk is generated. When a crosstalk value is beyond a particular range, the crosstalk interferes with normal transmission of optical signals in an optical fiber to affect the transmission quality of the optical signals. Therefore, in a space-division multiplexing elastic optical network, it is necessary to fully consider inter-core crosstalk and control a crosstalk value below a maximum tolerable crosstalk value threshold.

In a single-core elastic optical network, a service uses a first hit or random hit method to search selected working paths for spectrum resources required for a connection request. Selected spectrum resources need to satisfy a spectrum continuity constraint condition and a spectrum consistency constraint condition. Because a single core is used in a conventional elastic optical network, there is no crosstalk between adjacent cores, and it is impossible to examine the impact of the degree of spectral overlap between adjacent cores on crosstalk. However, in a space-division multiplexing elastic optical network, as the space-division multiplexing elastic optical network carries a large amount of service traffic, it is necessary to effectively protect network data services and prevent service loss caused by network failures. Therefore, in the space-division multiplexing elastic optical network, the survivability of the network needs to be considered to ensure the fast recoverability of data services and ensure the transmission reliability of data services. As can be seen, for each different data service, it is particularly important to improve the survivability of the space-division multiplexing elastic optical network and improve the spectral efficiency of the space-division multiplexing elastic optical network.

SUMMARY OF THE INVENTION

For this, a technical problem to be resolved by the present invention is to overcome problems in the prior art that a space-division multiplexing elastic optical network has poor survivability and an elastic optical network has low spectral efficiency, and provide a method and system for allocating a dedicated protected spectrum based on crosstalk awareness to achieve that a space-division multiplexing elastic optical network has strong survivability and an elastic optical network has high spectral efficiency.

To resolve the foregoing technical problems, a method for allocating a dedicated protected spectrum based on crosstalk awareness in the present invention includes the following steps: initializing a space-division multiplexing elastic optical network, and generating a connection request; calculating a plurality of working paths from a source node to a destination node, and determining whether the working paths are successfully established, where if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format; classifying cores according to the quantity of required spectrum slots, setting priorities for the cores, and determining whether available spectrum blocks in the cores meet a spectrum consistency constraint and a spectrum continuity constraint, where if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation; deleting the currently established working paths, calculating a plurality of dedicated protection paths from a source node to a destination node, determining whether the dedicated protection paths are successfully established, where if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and classifying cores according to the quantity of required spectrum slots, setting priorities for the cores, determining whether available spectrum blocks meet a spectrum consistency constraint and a spectrum continuity constraint, where if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

In an embodiment of the present invention, during the calculation of the plurality of working paths from the source node to the destination node, the working paths of the connection request are calculated by using a multiple shortest path algorithm.

In an embodiment of the present invention, during the calculation of the plurality of dedicated protection paths from the source node to the destination node, the dedicated protection paths of the connection request are calculated by using a multiple shortest path algorithm.

In an embodiment of the present invention, the available spectrum blocks are selected from links and cores of the space-division multiplexing elastic optical network.

In an embodiment of the present invention, during the classification of the cores according to the quantity of required spectrum slots and the setting of the priorities for the cores, a core with the highest priority is selected according to the quantity of required spectrum slots for transmission, if a corresponding core fails to be found, a core with a relatively high priority in cores of other types is selected for transmission, if a core still fails to be found, transmission is performed in a public core, and if transmission fails to be performed in a public core, it is determined that the connection request is blocked.

In an embodiment of the present invention, it is determined whether the available spectrum blocks meet the spectrum consistency constraint and the spectrum continuity constraint, if the available spectrum blocks do not meet the spectrum consistency constraint and the spectrum continuity constraint, a core with a next priority is selected, and if none of the cores has an available spectrum block, the connection request is blocked.

In an embodiment of the present invention, a method for calculating the inter-core crosstalk values of all the available spectrum blocks is: calculating an impact value between each spectrum block and a spectrum block of an adjacent core; then calculating crosstalk values with all adjacent cores, where if crosstalk values on all links are less than the first maximum allowable crosstalk threshold or the second maximum allowable crosstalk threshold, spectrum resource allocation schemes are kept, or otherwise, the connection request is blocked; and finally, selecting a scheme with the smallest crosstalk value from all the spectrum resource allocation schemes, and then allocating spectrum resources.

In an embodiment of the present invention, the first maximum allowable crosstalk threshold is the same as the second maximum allowable crosstalk threshold.

In an embodiment of the present invention, after step S5 is completed, a performance parameter of the network is evaluated according to a quantity of spectrum resources used in the entire network.

The present invention further provides a system for allocating a dedicated protected spectrum based on crosstalk awareness, including: a connection request module, configured to: initialize a space-division multiplexing elastic optical network, and generate a connection request; a working path establishment module, configured to: calculate a plurality of working paths from a source node to a destination node, and determine whether the working paths are successfully established, where if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format; a core classification module, configured to: classify cores according to the quantity of required spectrum slots, set priorities for the cores, determine whether available spectrum blocks in the cores meet a spectrum consistency constraint and a spectrum continuity constraint, where if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation; a dedicated protection path establishment module, configured to: delete the currently established working paths, calculate a plurality of dedicated protection paths from a source node to a destination node, determine whether the dedicated protection paths are successfully established, where if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and a spectrum allocation module, configured to: classify cores according to the quantity of required spectrum slots, set priorities for the cores, determine whether available spectrum blocks meet a spectrum consistency constraint and a spectrum continuity constraint, where if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

Compared with the prior art, the foregoing technical solution of the present invention has the following advantages:

The method and system for allocating a dedicated protected spectrum based on crosstalk awareness in the present invention include problems of calculation, core selection, a modulation format, and spectrum allocation. First, K working paths are calculated for each connection request, to ensure the survivability of each connection request. Second, an appropriate modulation format is selected according to distances of the working paths for transmission, a quantity of spectrum slots required for the connection request is determined, and a maximum allowable crosstalk value on an optical fiber link is satisfied. Next, to reduce the generation of spectrum fragments, multicore optical fibers are classified according to a bandwidth demand of the connection request, and a core priority is set according to the principle of minimizing transmission in adjacent cores, thereby reducing an inter-core crosstalk value. Then, while a spectrum continuity limit and a spectrum consistency limit are satisfied, inter-core crosstalk values of all available spectrum blocks are calculated, all available spectrum blocks with a crosstalk value not greater than a maximum allowable crosstalk value are kept, and an available spectrum block with the smallest crosstalk value is selected for spectrum allocation. Next, K dedicated protection paths are calculated, an appropriate modulation format is selected according to distances of the dedicated protection paths for transmission, a quantity of spectrum slots required for the connection request is determined, and a maximum allowable crosstalk value on an optical fiber link is satisfied. Finally, while a spectrum continuity limit and a spectrum consistency limit are satisfied, inter-core crosstalk values of all available spectrum blocks are calculated, all available spectrum blocks with a crosstalk value not greater than a maximum allowable crosstalk value are kept, and an available spectrum block with the smallest crosstalk value is selected for spectrum allocation. The present invention resolves the problems of calculation, core selection, a modulation format, and spectrum allocation for working paths and dedicated protection paths based on crosstalk awareness, thereby improving the spectrum resource efficiency of a space-division multiplexing elastic optical network, and reduces a crosstalk value of each fiber link, so that spectrum resources occupied by working paths and dedicated protection paths established for each connection request are optimized and crosstalk of the working paths and the dedicated protection paths is minimized.

BRIEF DESCRIPTION OF THE DRAWINGS

To make the content of the present invention clearer and more comprehensible, the present invention is further described in detail below according to specific embodiments of the present invention and the accompanying drawings. Where.

DETAILED DESCRIPTION OF THE PREFERRED EMBODIMENTS

Embodiment 1

Figure 1:
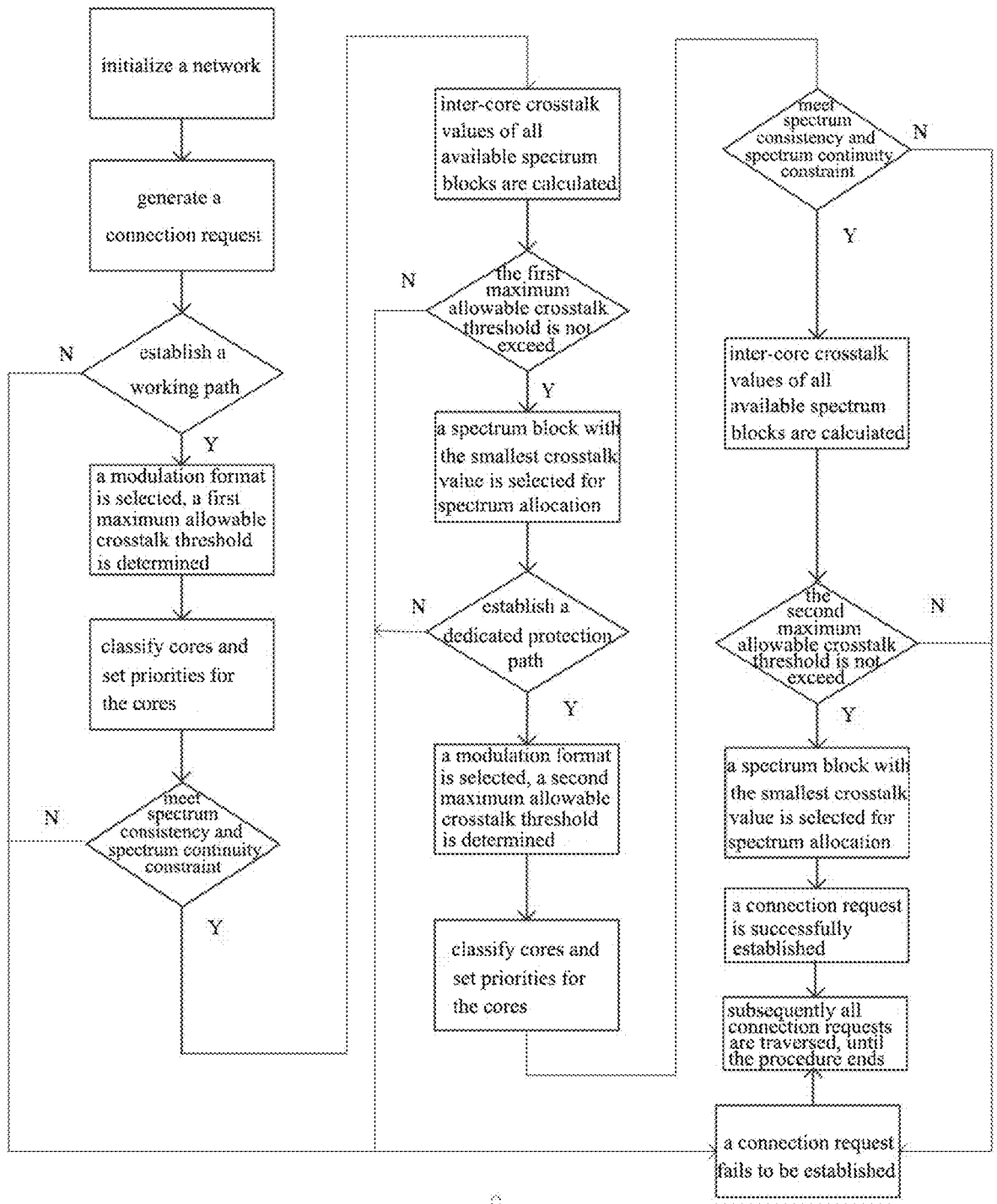
FIG. 1 is a flowchart of a method for allocating a dedicated protected spectrum based on crosstalk awareness.

As shown in FIG. 1, this embodiment provides a method for allocating a dedicated protected spectrum based on crosstalk awareness, including the following steps: step S1: initializing a space-division multiplexing elastic optical network, and generating a connection request; step S2: calculating a plurality of working paths from a source node to a destination node, and determining whether the working paths are successfully established, where if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format; step S3: classifying cores according to the quantity of required spectrum slots, setting priorities for the cores, determining whether available spectrum blocks in the cores meet a spectrum consistency constraint and a spectrum continuity constraint, where if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation; step S4: deleting the currently established working paths, calculating a plurality of dedicated protection paths from a source node to a destination node, determining whether the dedicated protection paths are successfully established, where if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and step S5: classifying cores according to the quantity of required spectrum slots, setting priorities for the cores, determining whether available spectrum blocks meet a spectrum consistency constraint and a spectrum continuity constraint, where if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

In the method for allocating a dedicated protected spectrum based on crosstalk awareness in this embodiment, in step S1, a space-division multiplexing elastic optical network is initialized, and a connection request is generated. In step S2, a plurality of working paths from a source node to a destination node are calculated, and it is determined whether the working paths are successfully established, where if not, the connection request is blocked, or if yes, the shortest path of the plurality of working paths is selected, to ensure the survivability of each connection request, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format, to help to improve the spectral efficiency of the space-division multiplexing elastic optical network. In step S3, to reduce the generation of spectrum fragments, cores are classified according to the quantity of required spectrum slots, priorities are set for the cores, and it is determined whether available spectrum blocks in the cores meet a spectrum consistency constraint and a spectrum continuity constraint, where if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation. Selection priorities of cores are set, and corresponding cores are designated to carry bandwidth demands of some types, thereby reducing the occupation of spectrum slots with the same number in adjacent cores by services, decreasing an adjacent crosstalk value, helping to flexibly allocate spectrum resources of different cores, and effectively improving the spectrum resource efficiency of the network. In step S4, the currently established working paths are deleted, to help to reduce a crosstalk value, a plurality of dedicated protection paths from a source node to a destination node are calculated, and it is determined that whether the dedicated protection paths are successfully established, where if not, the connection request is blocked, or if yes, the shortest path of the plurality of dedicated protection paths is selected, to ensure the survivability of each connection request, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format, to help to improve the survivability and spectral efficiency of the space-division multiplexing elastic optical network. In step S5, to reduce the generation of spectrum fragments, cores are classified according to the quantity of required spectrum slots, priorities are set for the cores, and it is determined whether available spectrum blocks meet a spectrum consistency constraint and a spectrum continuity constraint, where if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation. In the present invention, the working paths and the dedicated protection paths are established to improve the survivability of the space-division multiplexing elastic optical network, appropriate modulation formats are separately selected for the working paths and the protection paths according to the length of an optical fiber link, and spectrum resources of different cores are flexibly allocated, so that a spectrum allocation scheme is appropriately selected for a connection request, and network resources are optimized, thereby effectively improving the spectrum resource efficiency of the network.

In the plurality of dedicated protection paths, a spectrum block with the smallest crosstalk value is selected for spectrum allocation. In this case, it indicates that a connection request is successfully established, and subsequently all connection requests are traversed, until the procedure ends. In both the working paths and the dedicated protection paths, if a connection request fails to be established, all the connection requests are traversed, until the procedure ends.

In step S1, when the space-division multiplexing elastic optical network is initialized, the network is represented by G(E, V, C, F). E={$E_1, E_2, \ldots, E_{|E|-1}$}, V={$V_1, V_2, \ldots, V_{|V|-1}$}, C={$C_1, C_2, \ldots, C_{|C|-1}$}, and F={$F_1, F_2, \ldots, F_{|F|-1}$} respectively represent sets of links, switch nodes, cores, and available spectrums in the space-division multiplexing elastic optical network. |E|, |V|, |C|, and |F| respectively represent a quantity of optical fiber links, a quantity of switch nodes, a quantity of available cores, and a quantity of spectrum slots in each core in the optical network. ($V_i, V_j$) ∈ E. $V_i, V_j$ ∈ V, representing an optical fiber link from a switch node $V_i$ to a switch node $V_j$.

During the generation of a connection request, a group of connection requests are generated. CR represents a set of connection requests. For each connection request CR(s,d,N) in CR, CR(s,d,N) ∈ CR, s represents a source node of the connection request, d represents a destination node of the connection request, and N represents a required quantity of spectrum slots of the connection request.

In step S2, during the calculation of the plurality of working paths from the source node to the destination node, the working paths of the connection request are calculated by using a multiple shortest path algorithm. Specifically, a route is calculated for each connection request according to the source node s and the destination node d. When the connection request CR(s,d,N) ∈ CR arrives, K working paths from the node s to the node d are calculated for the connection request by using a K shortest path algorithm. If the working paths are successfully established, distances of the working paths of the connection request are calculated and are arranged in descending order. K paths with the shortest distances are selected as working paths. If the working paths fail to be established, it is determined that the connection request is blocked.

The distances of the working paths are calculated. An appropriate modulation format is selected for the working paths of the connection request. A quantity N of spectrum slots required for the connection request and a maximum inter-core crosstalk threshold $XT_{max}^l$ (dB) allowable on a link l are determined according to a bandwidth demand of the connection request and the selected modulation format.

In step S3, on the working paths, cores in optical fiber links are first classified according to the quantity of spectrum slots required for the connection request. Such classification of cores can make the use of spectrums more orderly, thereby reducing a quantity of spectrum fragments. Priorities are set for all cores according to the principle of minimizing transmission in adjacent cores, and cores are selected for the connection request according to the priority and class. During the classification of the cores according to the quantity of required spectrum slots and the setting of the priorities for the cores, a core with the highest priority is selected according to the quantity of required spectrum slots for transmission, if a corresponding core fails to be found, a core with a relatively high priority in cores of other types is selected for transmission, if a core still fails to be found, transmission is performed in a public core, and if transmission fails to be performed in a public core, it is determined that the connection request is blocked. Specifically, when CR(s,d,N) arrives, a core with the highest priority is selected according to the quantity N of required spectrum slots for transmission, and a core $c_i$ with the number of i is selected for transmission. If such a core fails to be found, a core with a relatively high priority in cores of other types is selected for transmission. If a core still fails to be found, transmission is performed in a public core, and if transmission fails to be performed in a public core, it is determined that the connection request is blocked.

On a link l of a working path, all available spectrum blocks that meet a spectrum consistency constraint and a spectrum continuity constraint are selected from the core $c_i$. Each spectrum block is denoted as $S_{j,N}^{il}$, where j represents a number of a starting spectrum slot, N represents a spectrum slot demand of the connection request, stored in a spectrum block set $S^i$. If no spectrum block meets requirements, a core with a next priority is selected. If no available spectrum block exists in all cores, it is determined that the connection request is blocked, to help to reduce an inter-core crosstalk value.

For all spectrum blocks in the set $S^i$, a crosstalk impact value $X_{j,N}^{il}$ of a spectrum slot with the number of j in spectrum blocks $S_{j,N}^{il}$ from an adjacent core is calculated according to Formula (1):

$$X_{j,N}^{il} = \begin{cases} \alpha \times \sum_{r \in A} f_j^{rl} & \sum_{r \in A} f_j^{rl} \leq 1 \\ \beta \times \sum_{r \in A} f_j^{rl} & \sum_{r \in A} f_j^{rl} > 1 \end{cases}, \quad (1)$$

where α and β are adjustable factors, A represents a set of cores adjacent to $c_i$. $f_j^{rl}$ is a binary variable. When a spectrum slot with the number of j in a core r on an optical fiber link l is occupied, $f_j^{rl}=1$. When the spectrum slot is not occupied, $f_j^{rl}=0$.

Next, a crosstalk value $XT_m^{il}$ (the unit is dB) of a spectrum block $S_{j,N}^{il}$ is calculated according to Formula (2):

$$XT_m^{il} = 10 \times lg \frac{n - n \times e^{-(n+1)\times 2\times h\times L}}{1 + n \times e^{-(n+1)\times 2\times h\times L}} \times \frac{\gamma + N}{\gamma + \Sigma_{j\in SV_m} X_{j,N}^{il}} \quad (2)$$

where n is a quantity of adjacent cores, L is the length of the current link l, $$h = \frac{2k^2 r}{\beta \Lambda}$$

is an average increase value of inter-core crosstalk in a unit optical fiber length, and k, r, β, and Λ respectively represent a coupling coefficient, a radius of curvature, a propagation coefficient, and a core gap. $X_{j,N}^{il}$ is a crosstalk impact value of a $j^{th}$ spectrum slot on the core $c_i$ on the optical fiber link l by an adjacent core. $\Sigma_{j\in sv_m} X_{j,N}^{il}$ represents a crosstalk impact value of an $m^{th}$ candidate spectrum block on the core $c_i$ on the optical fiber link l by an adjacent core; and $SV_m$ represents a set of spectrum slots of an $m^{th}$ spectrum block, that is, $SV_m \in \{F_m, F_{m+1}, \ldots, F_{m+N-1}\}$.

$XT_m^{il}$ is compared with $XT_{max}^{l}$. If $XT_m^{il} \geq XT_{max}^{l}$, $S_{j,N}^{il}$ is deleted from $S^i$. If $XT_m^{il} < XT_{max}^{l}$, $S_{j,N}^{il}$ is kept.

A crosstalk value $XT_{m,N}$ on the entire working path is calculated, a spectrum block with the smallest crosstalk value is selected for spectrum allocation, and a set $S^i$ of available spectrum blocks is cleared. Here, $XT_{m,N} = \Sigma_{l\in P} XT_m^{il}$, where l is an optical fiber link of a working path P.

In addition, a method for calculating the inter-core crosstalk values of all the available spectrum blocks is: calculating an impact value between each spectrum block and a spectrum block of an adjacent core; then calculating crosstalk values with all adjacent cores, where if crosstalk values on all links are less than the first maximum allowable crosstalk threshold, spectrum resource allocation schemes are kept, or otherwise, the connection request is blocked; and finally, selecting a scheme with the smallest crosstalk value from all the spectrum resource allocation schemes, and then allocating spectrum resources.

In step S4, during the calculation of the plurality of dedicated protection paths from the source node to the destination node, the dedicated protection paths of the connection request are calculated by using a multiple shortest path algorithm. Specifically, a route is calculated for each connection request according to the source node s and the destination node d. When the connection request CR(s,d,N) ∈ CR arrives, the K working paths from the node s to the node d are calculated for the connection request by using a K shortest path algorithm. If the dedicated protection paths are successfully established, distances of the dedicated protection paths of the connection request are calculated and are arranged in descending order. K paths with the shortest distances are selected as the dedicated protection paths. If the dedicated protection paths fail to be established, it is determined that the connection request is blocked.

The distances of the dedicated protection paths are calculated. An appropriate modulation format is selected for the dedicated protection paths of the connection request. A quantity N of spectrum slots required for the connection request and a maximum inter-core crosstalk threshold $XT_{max}^{l}$ (dB) allowable on a link l are determined according to a bandwidth demand of the connection request and the selected modulation format.

In step S5, on the dedicated protection paths, cores in optical fiber links are first classified according to the quantity of spectrum slots required for the connection request. Such classification of cores can make the use of spectrums more orderly, thereby reducing a quantity of spectrum fragments. Priorities are set for all cores according to the principle of minimizing transmission in adjacent cores, and cores are selected for the connection request according to the priority and class. During the classification of the cores according to the quantity of required spectrum slots and the setting of the priorities for the cores, a core with the highest priority is selected according to the quantity of required spectrum slots for transmission, if a corresponding core fails to be found, a core with a relatively high priority in cores of other types is selected for transmission, if a core still fails to be found, transmission is performed in a public core, and if transmission fails to be performed in a public core, it is determined that the connection request is blocked.

Moreover, the method for calculating the inter-core crosstalk values of all the available spectrum blocks is: calculating an impact value between each spectrum block and a spectrum block of an adjacent core; then calculating crosstalk values with all adjacent cores, where if crosstalk values on all links are less than the second maximum allowable crosstalk threshold, spectrum resource allocation schemes are kept, or otherwise, the connection request is blocked; and finally, selecting a scheme with the smallest crosstalk value from all the spectrum resource allocation schemes, and then allocating spectrum resources.

It is determined whether the available spectrum blocks meet the spectrum consistency constraint and the spectrum continuity constraint, if the available spectrum blocks do not meet the spectrum consistency constraint and the spectrum continuity constraint, a core with a next priority is selected, and if none of the cores has an available spectrum block, the connection request is blocked.

In addition, a method for calculating a crosstalk impact value between adjacent cores is the same as a calculation method on a working path. Therefore, details are not described again.

In this embodiment, the first maximum allowable crosstalk threshold is the same as the second maximum allowable crosstalk threshold.

After step S5 is completed, a performance parameter of the network is evaluated according to a quantity of spectrum resources used in the entire network. Specifically, after all connection requests have been processed, the performance parameter of the network is evaluated according to the quantity of spectrum resources used in the entire network.

After the performance parameter of the network is evaluated, a network status may be further monitored. Specifically, the monitoring of the status of parameter initialization, connection request generation, working path calculation, protection path calculation, modulation format selection, core selection, core classification and priority setting, spectrum resource allocation, spectrum resource release, and network performance evaluation of the space-division multiplexing elastic optical network is mainly completed.

After the network status is detected, and judgment and early warning further need to be performed on the network. Specifically, coordinated functions between the steps and judgment and early warning functions about whether establishment succeeds in each step are performed, to achieve the objectives of the routing, modulation format, and core and spectrum allocation in the space-division multiplexing elastic optical network, thereby improving the performance of the network and reducing a crosstalk value.

In this embodiment, a connection request failure represents that a connection request fails.

Detailed description is provided below with reference to the embodiments.

Figure 2:
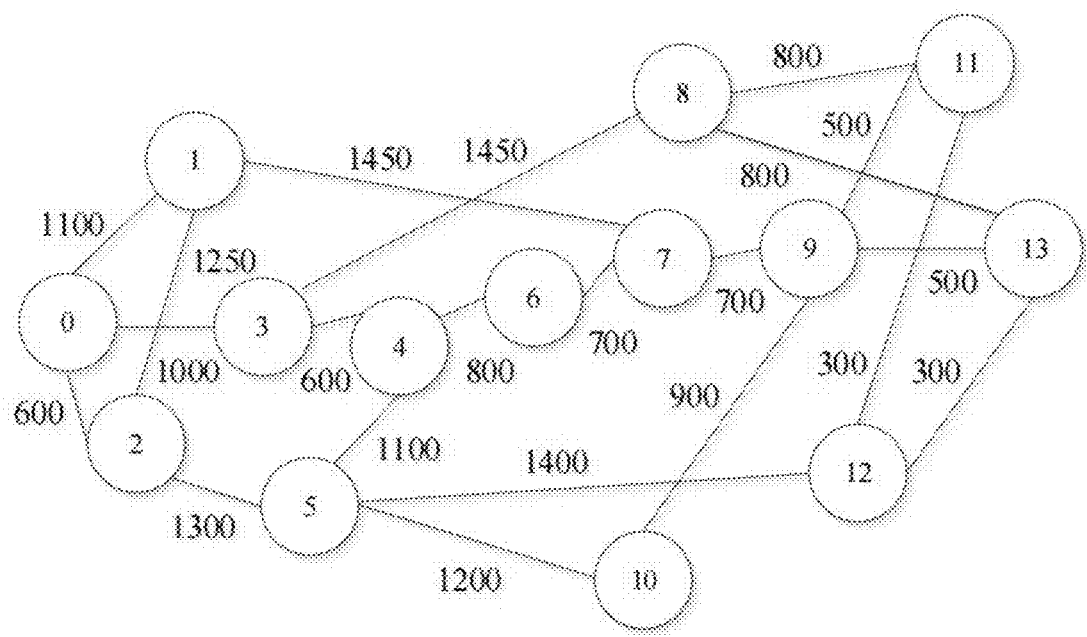
FIG. 2 is a topological graph of an NSFNET according to the present invention.
Figure 3:
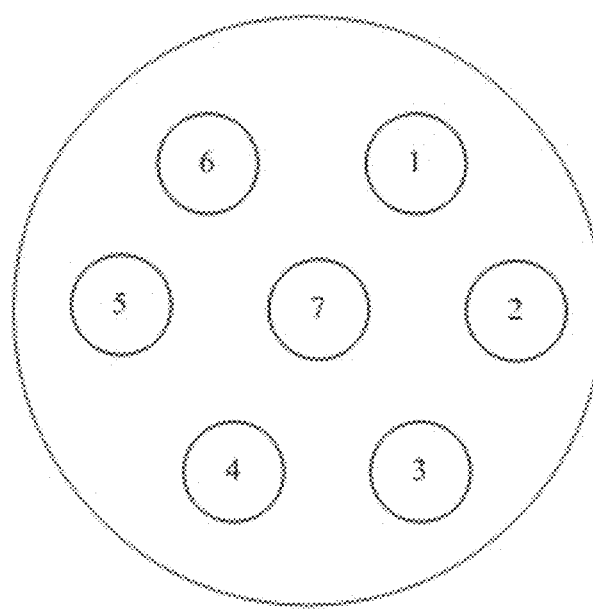
FIG. 3 is a schematic diagram of a seven-core optical fiber according to the present invention.
Figure 4:
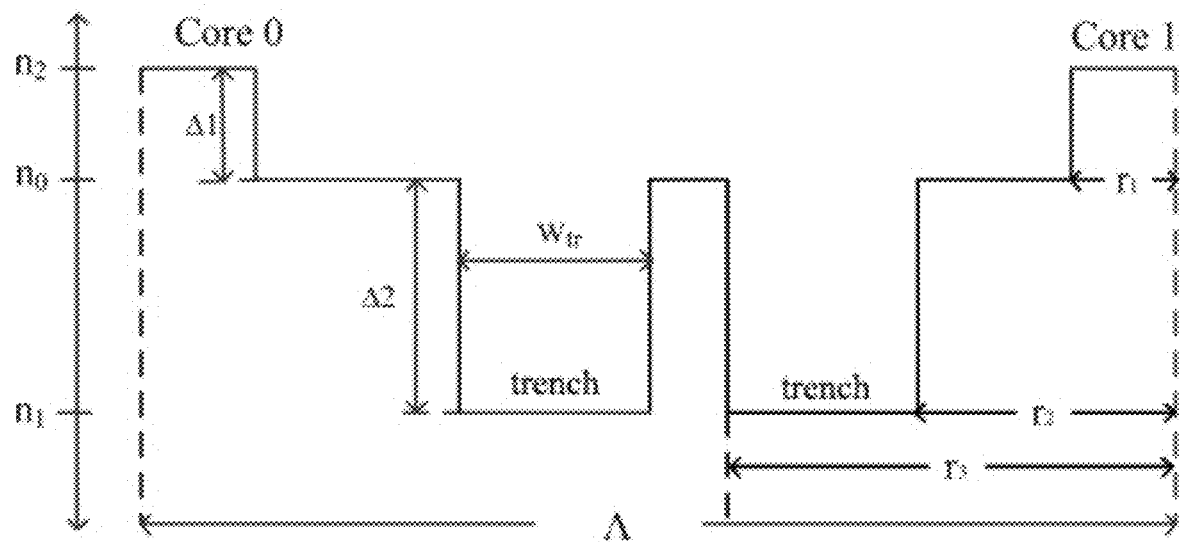
FIG. 4 shows the structure of a trench-assisted multicore optical fiber according to the present invention.

As shown in FIG. 2, the network topology of the NSFNET has a total of 14 nodes and 21 bidirectional links. A value on an optical fiber link represents the length of the link, in the unit of km. It is set that a modulation format of each service request is selected Quadrature Phase Shift Keying (QPSK). It is set that a spectrum bandwidth of each link is 200 GHz, a bandwidth of a spectrum slot is 12.5 GHz, that is, each core has a total of 16 spectrum slots, and a seven-core optical fiber is used in each link, as shown in FIG. 3. The seven-core optical fiber uses a trench-assisted structure shown in FIG. 4. The values of the parameters in the optical fiber are respectively $k=3.16\times10^{-5}$, $r=55$ (mm), $\beta=4\times10^{6}$, and $\Lambda=45$ (μm), and $$h = \frac{2\times(3.16\times10^{-5})^2 \times 55}{4\times10^6 \times 45} = 6.10\times10^{-13}.$$

Figure 5:
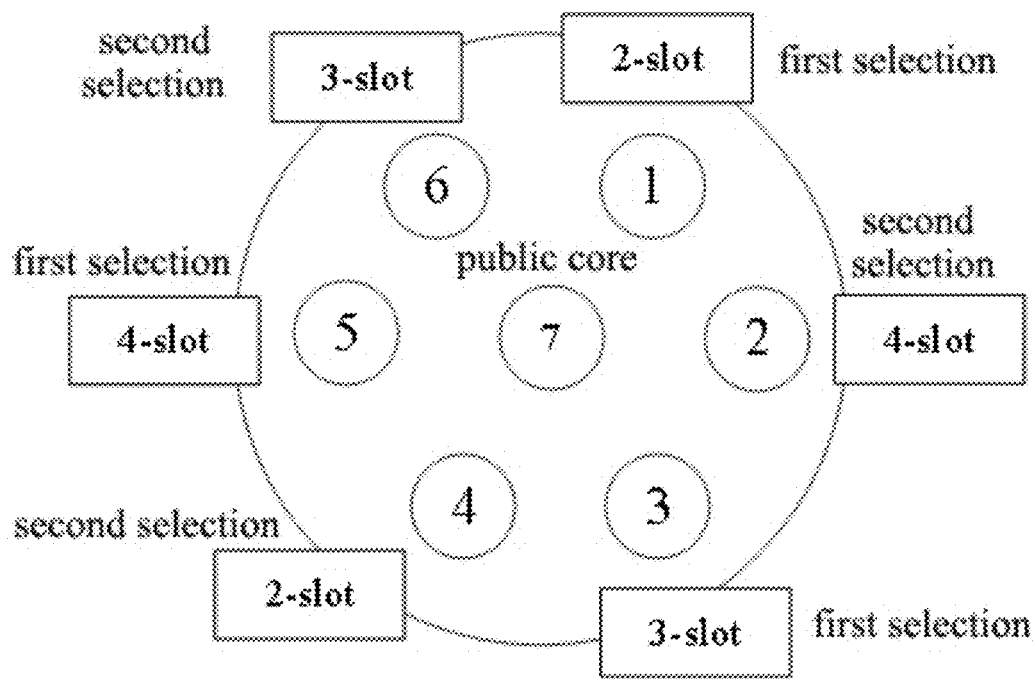
FIG. 5 is a schematic diagram of core classification and priority setting of a seven-core optical fiber according to the present invention.

It is assumed that a connection request $CR_1(s,d,N)$ is generated, where $s=2$, $d=11$, and $N=2$. It is set that $K=3$. A selected working path is 2-5-12-11. According to the length of each link, links $l_1$, $l_2$, and $l_3$ respectively represent optical fiber links (2, 5), (5, 12), and (12,11). QPSK is selected as a modulation format for the three optical fiber links. Therefore, the N value of the connection request on $l_1$, $l_2$, and $l_3$ is 2. A maximum allowable crosstalk value of each link is $XT_{max}^1=XT_{max}^2=XT_{max}^3=-18$ (dB). As shown in FIG. 3, the number of a seven-core optical fiber is represented by digits. The seven-core optical fiber is classified according to the N value of a service, and a priority is set for each optical fiber. As shown in FIG. 5, for a connection request of $N=2$, transmission is preferentially performed in a No. 1 core. For a connection request of $N=3$, transmission is preferentially performed in a No. 3 core. For a connection request of $N=4$, transmission is preferentially performed in a No. 5 core. When the cores cannot satisfy transmission requirements, transmission is performed in a No. 7 core. When $CR_1(2, 11, 2)$ arrives, a core $c_1$ is preferentially selected on the links $l_1$, $l_2$, and $l_3$. Searches are performed from the smallest spectrum slot number to the largest spectrum slot number on $c_1$ to find all available spectrum blocks that meet a spectrum continuity constraint condition and a spectrum consistency constraint condition.

Figure 6:
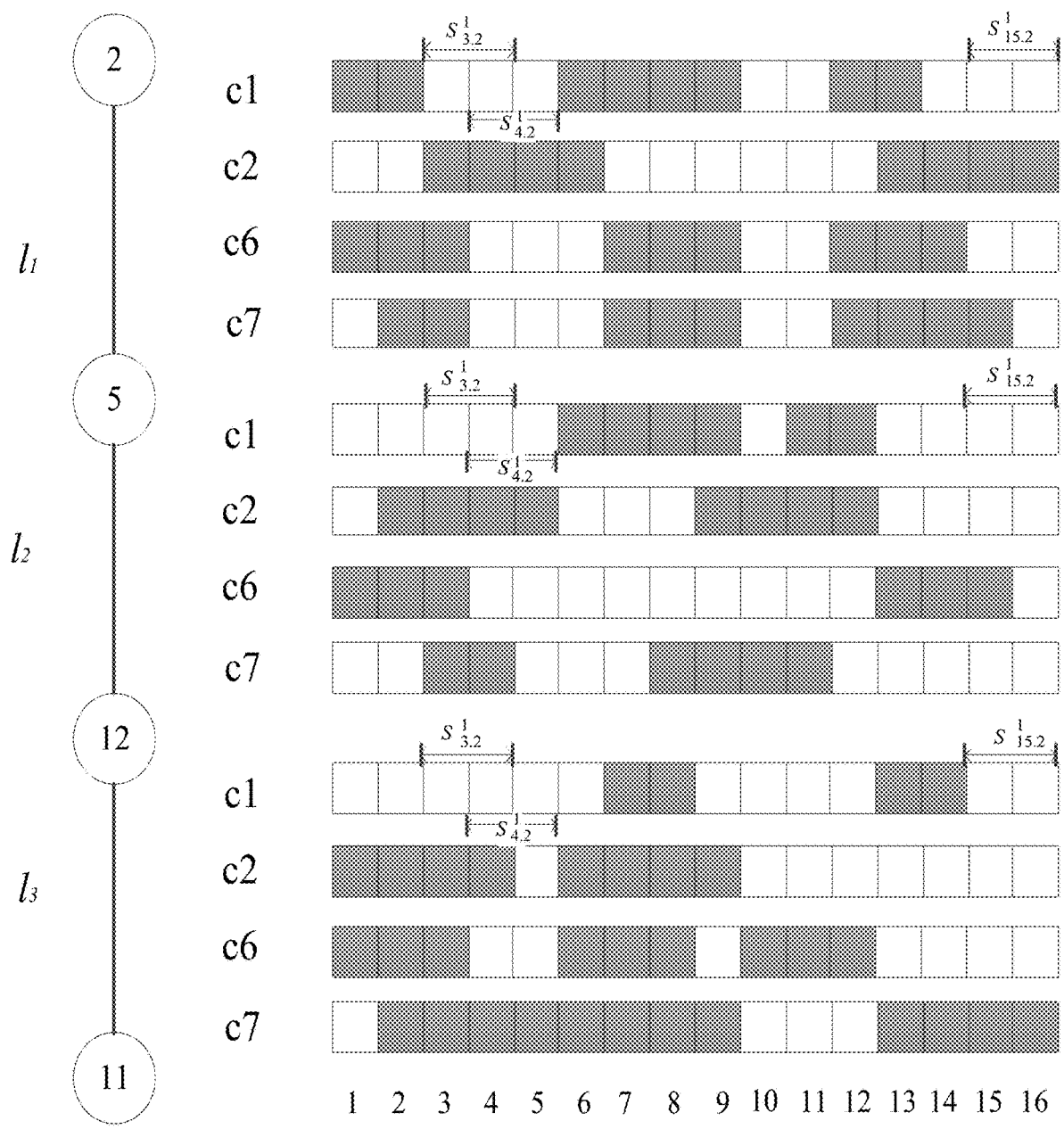
FIG. 6 is a schematic diagram of spectrum occupation status of cores on working paths according to the present invention.

When $CR_1(2, 11, 2)$ arrives, spectrum occupation status of the core $c_1$ and four adjacent cores are shown in FIG. 6. The gray color represents that a spectrum slot has been occupied. According to the spectrum continuity constraint and the spectrum consistency constraint, a set of selectable spectrum blocks in the core $c_1$ is $S^1=\{S_{3,2}^1, S_{4,2}^1, S_{15,2}^1\}$. It is set that $\alpha=0.5$, $\beta=3$, and $\gamma=1$. On the link $l_1$, the length of the optical fiber link is 1300 (km), $X_{3,2}^{11}=3\times3+0.5\times1=9.5$, and $XT_{3,2}^{11}=$ $$10\times lg \frac{3-3\times e^{-4\times 2\times 6.10\times 10^{-13}\times 1300}}{1+3\times e^{-4\times 2\times 6.10\times 10^{-13}\times 1300}} \times \frac{1+2}{1+9.5} = -23.779(dB);$$

$X_{4,2}^{11}=0.5\times1+0.5\times1=1$, and $$XT_{4,2}^{11} = 10\times lg \frac{3-3\times e^{-4\times 2\times 6.10\times 10^{-13}\times 1300}}{1+3\times e^{-4\times 2\times 6.10\times 10^{-13}\times 1300}} \times \frac{1+2}{1+1} = -124.839(dB);$$

$X_{15,2}^{11}=3\times2+0.5\times1=6.5$, $$XT_{15,2}^{11} = 10\times lg \frac{3-3\times e^{-4\times 2\times 6.10\times 10^{-13}\times 1300}}{1+3\times e^{-4\times 2\times 6.10\times 10^{-13}\times 1300}} \times \frac{1+2}{1+6.5} = -33.290(dB).$$

All the values are less than the maximum allowable crosstalk value. Similarly, on the link $l_2$, the length of the link is 1400 (km). $X_{3,2}^{12}=15$, and $XT_{3,2}^{12}=-15.544$ (dB) is greater than a crosstalk value. Therefore, the spectrum block $S_{3,2}^1$ is deleted from $S^1$, and $S^1=\{S_{4,2}^1, S_{15,2}^1\}$; $X_{4,2}^{12}=6.5$, $XT_{4,2}^{12}=-33.162$ (dB); and $X_{15,2}^{12}=0.5$, $XT_{15,2}^{12}=-165.808$ (dB). On the link $l_3$, the length of the link is 300 (km), $X_{4,2}^{13}=6.5$, $XT_{4,2}^{13}=-89.594$ (dB); and $X_{5,2}^{13}=1$, and $XT_{15,2}^{13}=-134.391$ (dB). Therefore, $XT_{4,2}=XT_{4,2}^{11}+XT_{4,2}^{12}+XT_{4,2}^{13}=-247.595$ (dB) and $XT_{15,2}=XT_{15,2}^{11}+XT_{15,2}^{12}+XT_{15,2}^{13}=-333.489$ (dB). Therefore, the spectrum block $S_{15,2}^1$ with the smallest total crosstalk value is selected. That is, two spectrum slots with the number of 15 and the number of 16 are selected.

Figure 7:
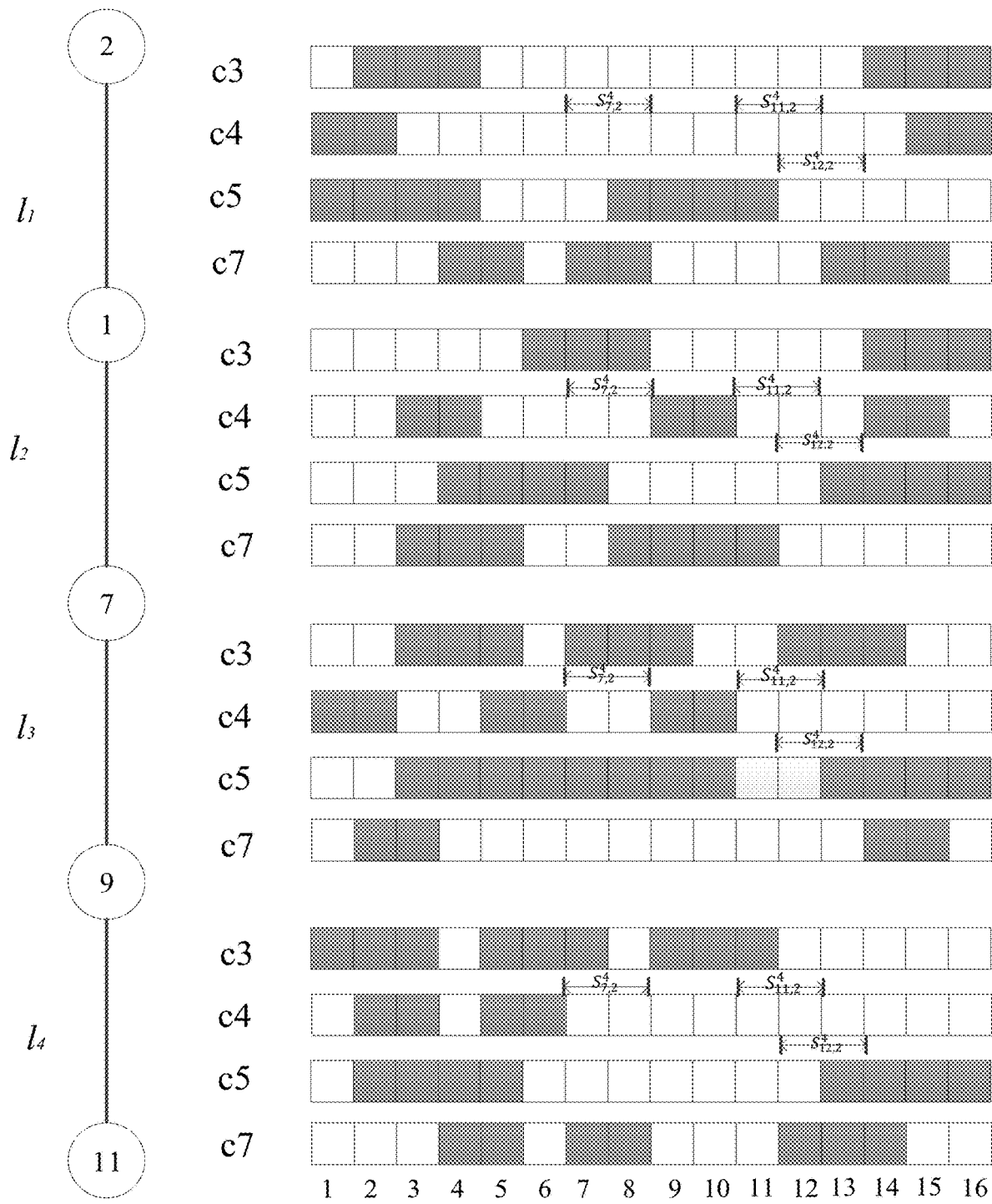
FIG. 7 is a schematic diagram of spectrum occupation status of cores on dedicated protection paths according to the present invention.

Next, a dedicated protection path 2-1-7-9-11 is established for $CR_1(2,11,2)$. According to the length of the link, QPSK is selected as the modulation format for the four links $l_1$ (2,1), $l_2$ (1,7), $l_3$ (7,9), and $l_4$ (9,11) on the dedicated protection path. Therefore, the N value of the connection request on $l_1$, $l_2$, $l_3$, and $l_4$ is 2. A maximum allowable crosstalk value of each link is $XT_{max}^1=XT_{max}^2=XT_{max}^3=XT_{max}^4=-18$ (dB). The core $c_4$ is selected for transmission. It is set when $CR_1(2, 11, 2)$ arrives, the spectrum status of the core $c_4$ and adjacent cores thereof on the link are shown in FIG. 7. The gray color represents that the spectrum slot has been occupied. According to the spectrum continuity constraint and the spectrum consistency constraint, a set of selectable spectrum blocks is $S^4=\{S_{7,2}^4, S_{11,2}^4, S_{12,2}^4\}$. It is set that $\alpha=0.5$, $\beta=3$, and $\gamma=1$, the link length on the link $l_1$ is 1250 (km), $XT_{7,2}^{41}=6.5$, $XT_{7,2}^{41}=-33.358$ (dB), $XT_{11,2}^{41}=0.5$, $XT_{11,2}^{41}=-166.792$ (dB), and $X_{12,2}^{41}=0.5$, $XT_{12,2}^{41}=-166.792$ (dB). On the link $l_2$, the length of the optical fiber link is 1450 (km), $X_{7,2}^{42}=12$, $XT_{7,2}^{42}=-19.010$ (dB), $X_{11,2}^{42}=0.5$, $XT_{11,2}^{42}=-165.503$ (dB), and $X_{12,2}^{42}=0.5$, and $XT_{12,2}^{42}=-165.503$ (dB). On the link $l_3$, $X_{7,2}^{43}=12$, $XT_{7,2}^{43}=-19.826$ (dB), $X_{11,2}^{43}=0.5$, $XT_{11,2}^{43}=-171.828$ (dB), and $X_{12,2}^{43}=6.5$, and $XT_{12,2}^{43}=-34.366$ (dB). On the link $l_4$, $X_{7,2}^{44}=6.5$, $XT_{7,2}^{44}=-33.350$ (dB), $X_{11,2}^{44}=1$, $XT_{11,2}^{44}=-125.063$ (dB), and $X_{12,2}^{44}=6.5$, and $XT_{12,2}^{44}=-34.950$ (dB). The crosstalk values of all spectrum blocks meet requirements, and therefore $S^4=\{S_{7,2}^4, S_{11,2}^4, S_{12,2}^4\}$. $XT_{7,2}=XT_{7,2}^{41}+XT_{7,2}^{42}+XT_{7,2}^{43}+XT_{7,2}^{44}=-105.544$ (dB), $XT_{11,2}=XT_{11,2}^{41}+XT_{11,2}^{42}+XT_{11,2}^{43}+XT_{11,2}^{44}=-628.986$ (dB), and $XT_{12,2}=XT_{12,2}^{41}+XT_{12,2}^{42}+XT_{12,2}^{43}+XT_{12,2}^{44}=-401.611$ (dB). The spectrum block $S_{11,2}^4$ with the smallest total crosstalk value is selected. That is, two spectrum slots with the number of 11 and the number of 12 are selected.

The connection request CR$_1$(2, 11, 2) is successfully established. A process of establishing another connection request is similar to that above.

Embodiment 2

Based on the same inventive concept, the present invention provides a system for allocating a dedicated protected spectrum based on crosstalk awareness. The principle of solving the problems is similar to that of the method for allocating a dedicated protected spectrum based on crosstalk awareness. Details are not repeated.

This embodiment provides a system for allocating a dedicated protected spectrum based on crosstalk awareness, including:
- a connection request module, configured to: initialize a space-division multiplexing elastic optical network, and generate a connection request;
- a working path establishment module, configured to: calculate a plurality of working paths from a source node to a destination node, and determine whether the working paths are successfully established, where if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format;
- a core classification module, configured to: classify cores according to the quantity of required spectrum slots, set priorities for the cores, determine whether available spectrum blocks in the cores meet a spectrum consistency constraint and a spectrum continuity constraint, where if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation;
- a dedicated protection path establishment module, configured to: delete the currently established working paths, calculate a plurality of dedicated protection paths from a source node to a destination node, determine whether the dedicated protection paths are successfully established, where if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and
- a spectrum allocation module, configured to: classify cores according to the quantity of required spectrum slots, set priorities for the cores, determine whether available spectrum blocks meet a spectrum consistency constraint and a spectrum continuity constraint, where if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for allocating a dedicated protected spectrum based on crosstalk awareness, comprising steps of:
   - step S1: initializing a space-division multiplexing elastic optical network, and generating a connection request;
   - step S2: calculating a plurality of working paths from a source node to a destination node, and determining whether the working paths are successfully established, wherein if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format;

step S3: classifying cores according to the quantity of required spectrum slots, setting priorities for the cores, and determining whether available spectrum blocks in the cores meet a spectrum consistency constraint and a spectrum continuity constraint, wherein if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation;

step S4: deleting the currently established working paths, calculating a plurality of dedicated protection paths from a source node to a destination node, determining whether the dedicated protection paths are successfully established, wherein if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and step S5: classifying cores according to the quantity of required spectrum slots, setting priorities for the cores, and determining whether available spectrum blocks meet a spectrum consistency constraint and a spectrum continuity constraint, wherein if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

2. The method for allocating a dedicated protected spectrum based on crosstalk awareness according to claim 1, wherein during the calculation of the plurality of working paths from the source node to the destination node, the working paths of the connection request are calculated by using a multiple shortest path algorithm.

3. The method for allocating a dedicated protected spectrum based on crosstalk awareness according to claim 1, wherein during the calculation of the plurality of dedicated protection paths from the source node to the destination node, the dedicated protection paths of the connection request are calculated by using a multiple shortest path algorithm.

4. The method for allocating a dedicated protected spectrum based on crosstalk awareness according to claim 1, wherein during the classification of the cores according to the quantity of required spectrum slots and the setting of the priorities for the cores, a core with the highest priority is selected according to the quantity of required spectrum slots for transmission, if a corresponding core fails to be found, a core with a relatively high priority in cores of other types is selected for transmission, if a core still fails to be found, transmission is performed in a public core, and if transmission fails to be performed in a public core, it is determined that the connection request is blocked.

5. The method for allocating a dedicated protected spectrum based on crosstalk awareness according to claim 1, wherein it is determined whether the available spectrum blocks meet the spectrum consistency constraint and the spectrum continuity constraint, if the available spectrum blocks do not meet the spectrum consistency constraint and the spectrum continuity constraint, a core with a next priority is selected, and if none of the cores has an available spectrum block, the connection request is blocked.

6. The method for allocating a dedicated protected spectrum based on crosstalk awareness according to claim 1, wherein a method for calculating the inter-core crosstalk values of all the available spectrum blocks comprises: calculating an impact value between each spectrum block and a spectrum block of an adjacent core; then calculating crosstalk values with all adjacent cores, wherein if crosstalk values on all links are less than the first maximum allowable crosstalk threshold or the second maximum allowable crosstalk threshold, spectrum resource allocation schemes are kept, or otherwise, the connection request is blocked; and finally, selecting a scheme with the smallest crosstalk value from all the spectrum resource allocation schemes, and then allocating spectrum resources.

7. The method for allocating a dedicated protected spectrum based on crosstalk awareness according to claim 1, wherein the first maximum allowable crosstalk threshold is the same as the second maximum allowable crosstalk threshold.

8. The method for allocating a dedicated protected spectrum based on crosstalk awareness according to claim 1, wherein after step S5 is completed, a performance parameter of the network is evaluated according to a quantity of spectrum resources used in the entire network.

9. The method for allocating a dedicated protected spectrum based on crosstalk awareness according to claim 8, wherein after the performance parameter of the network is evaluated, a network status is monitored; and judgment and early warning are performed on the network.

10. A system for allocating a dedicated protected spectrum based on crosstalk awareness, comprising:
  a connection request module, configured to: initialize a space-division multiplexing elastic optical network, and generate a connection request;
  a working path establishment module, configured to: calculate a plurality of working paths from a source node to a destination node, and determine whether the working paths are successfully established, wherein if not, the connection request is blocked, or if yes, the shortest path of the plurality of working paths is selected, a corresponding modulation format is selected according to the shortest path, and a quantity of spectrum slots required for the connection request and a first maximum allowable crosstalk threshold on a fiber optic link are determined according to a bandwidth demand of the connection request and the selected modulation format;
  a core classification module, configured to: classify cores according to the quantity of required spectrum slots, set priorities for the cores, determine whether available spectrum blocks in the cores meet a spectrum consistency constraint and a spectrum continuity constraint, wherein if not, the connection request is blocked, or if yes, inter-core crosstalk values of all available spectrum blocks are calculated, and it is determined whether the first maximum allowable crosstalk threshold is exceeded, and if yes, the connection request is blocked, or if not, a spectrum block with the smallest crosstalk value is selected for spectrum allocation;

a dedicated protection path establishment module, configured to: delete the currently established working paths, calculate a plurality of dedicated protection paths from a source node to a destination node, determine whether the dedicated protection paths are successfully established, wherein if not, the connection request is blocked, or if yes, the shortest path of the plurality of dedicated protection paths is selected, a corresponding modulation format is selected according to the shortest path, and a quantity of spectrum slots required for the connection request and a second maximum allowable crosstalk threshold on a fiber optic link are determined according to a bandwidth demand of the connection request and the selected modulation format; and a spectrum allocation module, configured to: classify cores according to the quantity of required spectrum slots, set priorities for the cores, and determine whether available spectrum blocks meet a spectrum consistency constraint and a spectrum continuity constraint, wherein if not, the connection request is blocked, or if yes, inter-core crosstalk values of all available spectrum blocks are calculated, and it is determined whether the second maximum allowable crosstalk threshold is exceeded, and if yes, the connection request is blocked, or if not, a spectrum block with the smallest crosstalk value is selected for spectrum allocation.

\* \* \* \* \*